GOLIGHTLY & TWITCHELL.

Folding Arm Chair.

No. 1,716.

Reissued July 5, 1864.

Witnesses.
Edwin Case
R. Fitzgerald.

Inventors.
Henry S. Golightly
Charles S Twitchell

N. PETERS. Photo-Lithographer. Washington, D. C.

UNITED STATES PATENT OFFICE.

JAMES G. ENGLISH AND EDWIN F. MERSICK, OF NEW HAVEN, CONNECTICUT, ASSIGNEES OF H. S. GOLIGHTLY AND C. S. TWITCHELL, OF SAME PLACE.

IMPROVED FOLDING ARM-CHAIR.

Specification forming part of Letters Patent No. 40,210, dated October 6, 1863; Reissue No. 1,716, dated July 5, 1864.

*To all whom it may concern:*

Be it known that H. S. GOLIGHTLY and C. S. TWITCHELL, both of New Haven, in the county of New Haven and State of Connecticut, have invented certain new and useful Improvements in Folding Arm-Chairs; and we hereby declare that the following is a full, clear, and exact description of the same, reference being had to the accompanying drawings, in which—

Figure 1:
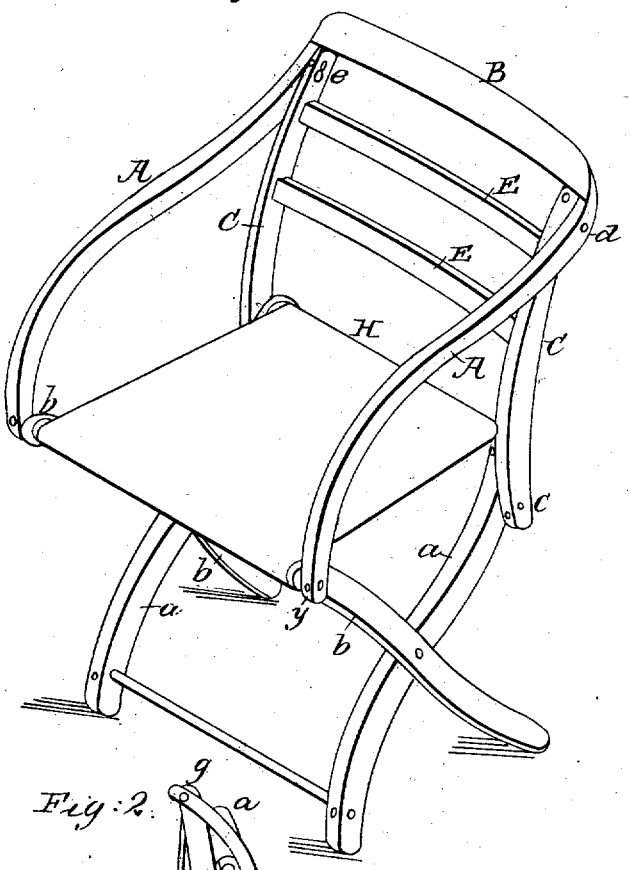
Figure 2:
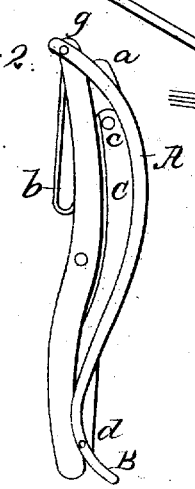

Figure 1 is an isometrical perspective view of the improved chair when set up or open for use, and Fig. 2 a side elevation of the same when folded.

Folding arm-chairs as heretofore made were constructed with arms made of some flexible material or otherwise so as to fold, or with arms slotted or otherwise so as to slide at their points of attachment; or, again, with arms which were made in such manner as to be capable of being disconnected from or connected to the back or other point of attachment. Many objections are urged against either of these folding arm-chairs, among which we would state the extreme limberness or collapsibility which renders the chair in some measure insecure and always troublesome when moved from one place to another, the expense and difficulty attending their manufacture when slotted or hooked arms are used, the liability of their getting out of shape and working order, and general inconvenience in using them. To obviate these and other objections is the object of this invention; and it consists, first, in locating the pivot-joints of the standards and rear legs in such relation to the pivot-joints of the arms that on folding the chair the said joints shall be situated according to the angles of a triangle in any position intermediate between, being open and being folded substantially as hereinafter set forth; second, in so connecting the parts of a folding arm-chair by pivot-joints that the complete folding may be effected by simply drawing the legs together, substantially as hereinafter set forth; third, in the construction and arrangement of an arm-chair capable of being folded upon joints without any of the parts thereof having of necessity a sliding motion in or upon the joints, substantially as hereinafter set forth.

To enable others to make and use this invention, we shall now proceed to describe the construction and operation of a chair made in accordance therewith.

The legs A and B, crossing upon a rundle, *r*, support the seat C by means of two bars, *c* and *d*, which unite the tops of the front legs, A, and rear legs, B, respectively. The bar *c* is extended sidewise through and beyond the legs and forms the pins upon which the lower ends of the arms D are pivoted. The back of the chair is composed of two standards, E, united transversely by means of bars or slats G. These standards are held in place by being united with the arms D and legs B by means of pivot-joints at *a* and *b*.

The location of the pivot-joints constitutes the essential feature of this invention.

After numerous experiments it was found that the joints *a*, *b*, and *c* must bear certain relation to each other, without which the object of this invention cannot be attained in chairs of the general character described. The relation found necessary and essential is that the three points constituting the said joints should determine a triangle when the chair is open or in any position intermediate between being open and folded, and shall only coincide or nearly coincide in one line when the chair is folded. When folded, the three joints coincide or nearly coincide in one and the same line, as indicated in Fig. 2 by letters *a b c*.

Two sides of the triangle—*i. e.*, those determined by the back and the arms—are of fixed or unchangeable length; the third side, which is the distance between the joint *b* on the rear legs and the joint *c* on the front legs, is changeable, and becomes shorter as the chair is being folded. The angle at *b* is gradually enlarged as the chair folds from ninety degrees or thereabouts to one hundred and eighty degrees or thereabouts, when the three points *a b c* are all situated in one and the same line, or nearly in one and the same line. By this arrangement the chair is made self-folding by simply drawing the legs together, no other movement being required to effect the complete folding of the chair.

In chairs in which the joints are located so that they coincide in one line during the folding of the chair—that is to say, in any of the intermediate positions between being open and folded—the parts must slide upon each other, and slots or other equivalent contrivances are required in order to allow the parts so to slide.

In folding arm-chairs constructed with regard to the location of the joints *a b c*, as described, provision may be made for the more easy folding of the chair by simply enlarging the hole in which the pivot *a* works; but, inasmuch as the object of making arm-chairs to fold is simply to facilitate transportation, it is deemed a desideratum that when in use the chair should present a certain degree of rigidity or stiffness, enabling its being moved from one place to another without necessitating adjustments, or without danger of collapsing, which in many instances—that is to say, in chairs having slotted arms—were the cause of painful and serious injury to the hand.

By constructing a folding arm-chair as above set forth with fixed pivot-joints—that is to say, without an enlarged hole or slot at the point of attachment of the arms with the standards of the back—a chair will be produced which, while admitting of being folded, will present the requisite rigidity or stiffness either when open or folded, so that it may be moved in either position from place to place without collapsing in the one case or spontaneously unfolding in the other.

Having now fully described the said invention, what we claim as the invention of GOLIGHTLY and TWITCHELL is—

1. Locating the pivot-joints of the standards and rear legs in such relation to the pivot-joints of the arms that on folding the chair the said joints shall be situated according to the angles of a triangle in any position intermediate between being open and being folded, substantially as set forth.

2. So connecting the parts of a folding arm-chair by pivot-joints that the complete folding may be effected by simply drawing the legs together, substantially as set forth.

3. The construction and arrangement of an arm-chair capable of being folded upon joints without any of the parts thereof having of necessity a sliding motion in or upon the joints, substantially as set forth.

In testimony whereof we have signed our names to this specification before two subscribing witnesses.

JAMES G. ENGLISH.
EDWIN F. MERSICK.

Witnesses:
JOHN M. WHITNEY,
ABRAHAM CAMMERER.